US008123404B2

(12) United States Patent
Lee

(10) Patent No.: US 8,123,404 B2
(45) Date of Patent: Feb. 28, 2012

(54) TEMPERATURE DETECTOR AND THE METHOD USING THE SAME

(75) Inventor: Wen Ming Lee, Tao-Yuan Hsien (TW)

(73) Assignee: Nanya Technology Corp., Kueishan, Tao-Yuan Hsien (TW)

(*) Notice: Subject to any disclaimer, the term of this patent is extended or adjusted under 35 U.S.C. 154(b) by 901 days.

(21) Appl. No.: 12/170,854

(22) Filed: Jul. 10, 2008

(65) Prior Publication Data

US 2009/0268778 A1 Oct. 29, 2009

(30) Foreign Application Priority Data

Apr. 23, 2008 (TW) .............................. 97114788 A

(51) Int. Cl.
*G01K 7/00* (2006.01)
(52) U.S. Cl. ....................................... 374/163; 327/513
(58) Field of Classification Search .................. 374/163, 374/170, 178, 183–184; 702/132; 327/512–513; 363/21.12, 21.13, 21.01
See application file for complete search history.

(56) References Cited

U.S. PATENT DOCUMENTS 4,061,033 A * 12/1977 Nixon ........................... 374/103
(Continued)

OTHER PUBLICATIONS

Office Action issued in corresponding Chinese Application No. 2008100981967 on Apr. 29, 2010.
(Continued)

*Primary Examiner* — Lisa Caputo
*Assistant Examiner* — Tania Courson
(74) *Attorney, Agent, or Firm* — Connolly Bove Lodge & Hutz LLP

(57) ABSTRACT

A temperature detector comprises a first current mirror, a second current mirror, a first pulse generator, a second pulse generator, a phase detector and a controller. The current of the first current mirror is in variation with temperature, but the current of the second current mirror is not. If the output pulse of the first pulse generator appears earlier than that of the second pulse generator, the controller enhances the output current of the second current mirror. If the output pulse of the first pulse generator appears later than that of the second pulse generator, the controller decreases the output current of the second current mirror.

15 Claims, 3 Drawing Sheets

U.S. PATENT DOCUMENTS

| | | | |
|---|---|---|---|
| 5,638,418 | A | 6/1997 | Douglass et al. |
| 5,726,874 | A * | 3/1998 | Liang .............................. 363/141 |
| 6,421,626 | B1 * | 7/2002 | Yin ................................. 702/132 |
| 6,925,828 | B1 * | 8/2005 | Gerstner et al. ............. 62/259.2 |
| 7,312,648 | B2 * | 12/2007 | Yang .............................. 327/512 |
| 7,502,274 | B2 * | 3/2009 | Lee et al. ....................... 365/211 |
| 7,667,987 | B2 * | 2/2010 | Huynh et al. ............... 363/21.12 |
| 7,698,095 | B2 * | 4/2010 | Chung et al. .................. 702/151 |
| 7,772,915 | B2 * | 8/2010 | Kim ................................ 327/512 |
| 7,816,973 | B2 * | 10/2010 | Pan ................................ 327/513 |
| 7,961,483 | B2 * | 6/2011 | Huynh et al. ............... 363/21.12 |
| 2007/0280330 | A1 * | 12/2007 | Jeong et al. .................... 374/141 |
| 2009/0296779 | A1 * | 12/2009 | Lee ................................. 374/170 |
| 2011/0029272 | A1 * | 2/2011 | Lee ................................. 702/130 |

OTHER PUBLICATIONS

Office Action issued in corresponding Taiwanese counterpart Application No. 097114788 issued on Sep. 26, 2011 with Summary Translation thereof.

* cited by examiner

TEMPERATURE DETECTOR AND THE METHOD USING THE SAME

BACKGROUND OF THE INVENTION

1. Field of the Invention

The present invention relates to a temperature detector and the method using the same, and more particularly to a temperature detector which uses a phase detector to make an adjustment and the method thereof.

2. Description of the Related Art

Most electronic appliances or devices are sensitive to variance of operating temperature. For example, the output performance of the digital camera is significantly affected by the operating temperature. Temperature variations also affect the operating point and speed of ICs. To facilitate more stable performance, most electronic appliances use a temperature detector to detect outside temperature and compensate signals accordingly.

Most well-known temperature detectors use voltage dividers. However, there is a trend to gradually reduce power voltage. In the design of voltage dividers, it is more difficult to deal with a low power voltage and a large range of input voltage levels. In addition, the manufacture of such temperature detector is also difficult.

SUMMARY OF THE INVENTION

The temperature detector in accordance with one embodiment of the present invention comprises a first current mirror, a second current mirror, a first capacitor, a second capacitor, a first comparator, a second comparator, a phase detector, a first transistor, a second transistor and a controller. The current of the first current mirror is temperature-dependent. The current of the second current mirror is temperature-independent. The first capacitor is connected to an output of the first current mirror. The second capacitor is connected to an output of the second current mirror. The input terminal of the first comparator is connected to the first capacitor and a reference voltage. The input terminal of the second comparator is connected to the second capacitor and the reference voltage. The phase detector is connected to the output of the first comparator and the output of the second comparator. The first transistor has a gate, an input terminal and an output terminal, wherein the gate is connected to the output of the first comparator, the input terminal is connected to the first capacitor and the output terminal is grounded. The second transistor has a gate, an input terminal and an output terminal, wherein the gate is connected to the output of the second comparator, the input terminal is connected to the second capacitor and the output terminal is grounded. The input of the controller is connected to the output of the phase detector, and the controller is configured to control the output current of the second current mirror.

The temperature detector in accordance with one embodiment of the present invention comprises a first current mirror, a second current mirror, a first pulse generator, a second pulse generator, a phase detector and a controller. The current of the first current mirror is temperature-dependent. The current of the second current mirror is temperature-independent. The first pulse generator is connected to an output of the first current mirror, wherein the pulse period of the first pulse generator is inversely proportional to the current value of the first current mirror. The second pulse generator is connected to an output of the second current mirror, wherein the pulse period of the second pulse generator is inversely proportional to the current value of the second current mirror. The phase detector is connected to the output of the first and second pulse generators. The input terminal of the controller is connected to the output of the phase detector and used to control the output current of the second current mirror, wherein if the output pulse of the first pulse generator appears earlier than the output pulse of the second pulse generator, the controller enhances the output current of the second current mirror; otherwise, the controller reduces the output current of the second current mirror.

The method of using a temperature detector in accordance with one embodiment of the present invention comprises the steps of: providing a temperature-dependent current from a first current mirror and a temperature-independent current from a second current mirror; generating a first pulse and a second pulse, wherein the period of the first pulse is inversely proportional to the current value of the first current mirror, and the period of the second pulse is inversely proportional to the current value of the second current mirror; increasing the output current of the second current mirror if the first pulse appears earlier than the second pulse; decreasing the output current of the second current mirror if the first pulse appears later than the second pulse; and calculating a temperature value in accordance with the current value of the second current mirror if the first pulse and the second pulse appear at substantially the same time.

BRIEF DESCRIPTION OF THE DRAWINGS

The invention will be described according to the appended drawings in which:

FIG. 2($b$) shows the relation of the output voltage of the first capacitor and second capacitor versus time.

PREFERRED EMBODIMENT OF THE PRESENT INVENTION

Figure 1:
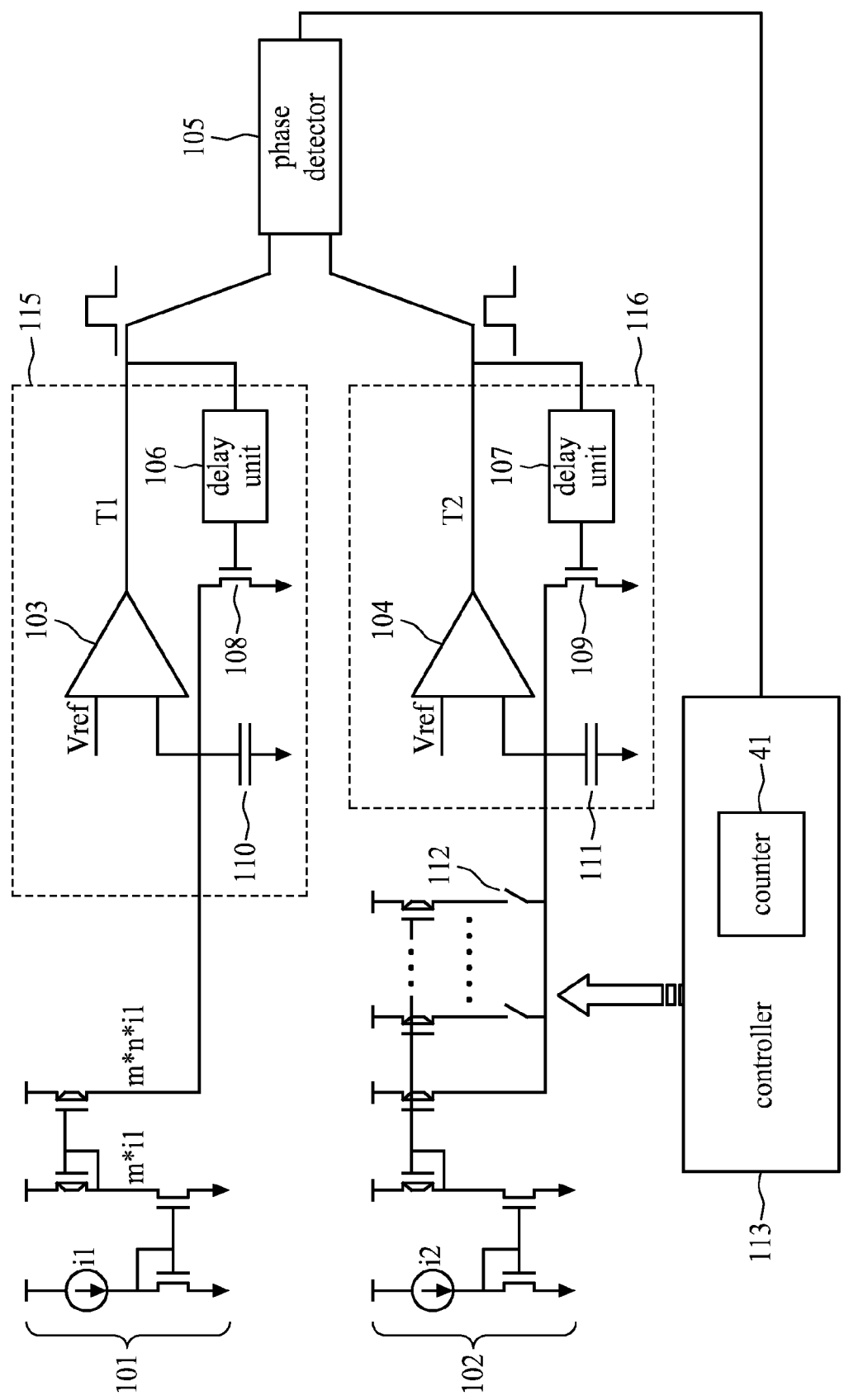
FIG. 1 shows a temperature detector according to one embodiment of the present invention.

FIG. 1 shows a temperature detector according to one embodiment of the present invention. A first current mirror 101 has an initial current i1, which is temperature-dependent. The initial current i1 can be generated by a diode circuit. Because the threshold voltage of the diode is temperature-dependent, the output current of the diode is also temperature-dependent. The temperature detector also provides an initial current i2 of a second current mirror, which is temperature-independent. Through the amplification of the first current mirror 101 and the second current mirror 102, the output currents of the first current mirror 101 and the second current mirror 102 are m×n×i1 and x×y×i2, where m, n, x and y could be adjusted based on demand. A first pulse generator 115 includes a first capacitor 110, a first comparator 103, a first delay unit 106 and a first transistor 108. A second pulse generator 116 includes a second capacitor 111, a second comparator 104, a second delay unit 107 and a second transistor 109. The first capacitor 110 is connected to the output of the first current mirror 101, while the second capacitor 111 is connected to the output of the second current mirror 102. The input terminal of the first comparator 103 is connected to the first capacitor 110 and a reference voltage Vref. The input terminal of the second comparator 104 is connected to the second capacitor 111 and the reference voltage Vref. The gate of the first transistor 108 is connected to the output of the first comparator 103, the input of the first transistor 108 is connected to the first capacitor 110, and the output of the first transistor 108 is grounded. The gate of the second transistor 109 is connected to the output of the second comparator 104, and the input of the second transistor 109 is connected to the second capacitor 111, and the output of the second transistor 109 is grounded. The gates of the first transistor 108 and the second transistor 109 are connected to the outputs of the first comparator 103 and second comparator 104 through the first delay unit 106 and second delay unit 107, respectively. The first delay unit 106 and the second delay unit 107 are used to determine the width of the output pulses. The first pulse is used to erase the charges of the first capacitor 110 through the first delay unit 106. The second pulse is used to erase the charges of the second capacitor 111 through the second delay unit 107. The phase detector 105 is connected to the output of the first comparator 103 and second comparator 104. The input terminal of the controller 113 is connected to the output of the phase detector 105, and the output terminal of the controller 113 is used to control the output current of the second current mirror 102. The controller 113 includes a counter 41, whose content is adjusted in accordance with the output of the phase detector, and the counter is used to calculate the temperature value.

The first current mirror 101 is used to charge the first capacitor 110. If the output voltage of the first capacitor 110 is greater than Vref, a first pulse will be generated to the input of the phase detector 105. The second current mirror 102 is used to charge to the second capacitor 111. The switches 112 are set to on or off and some of the switches 112 are turned off if the current of the second current mirror 102 needs to be decreased. If the output voltage of the second capacitor 111 is greater than Vref, a second pulse will be generated to the input of the phase detector 105.

Figure 2A:
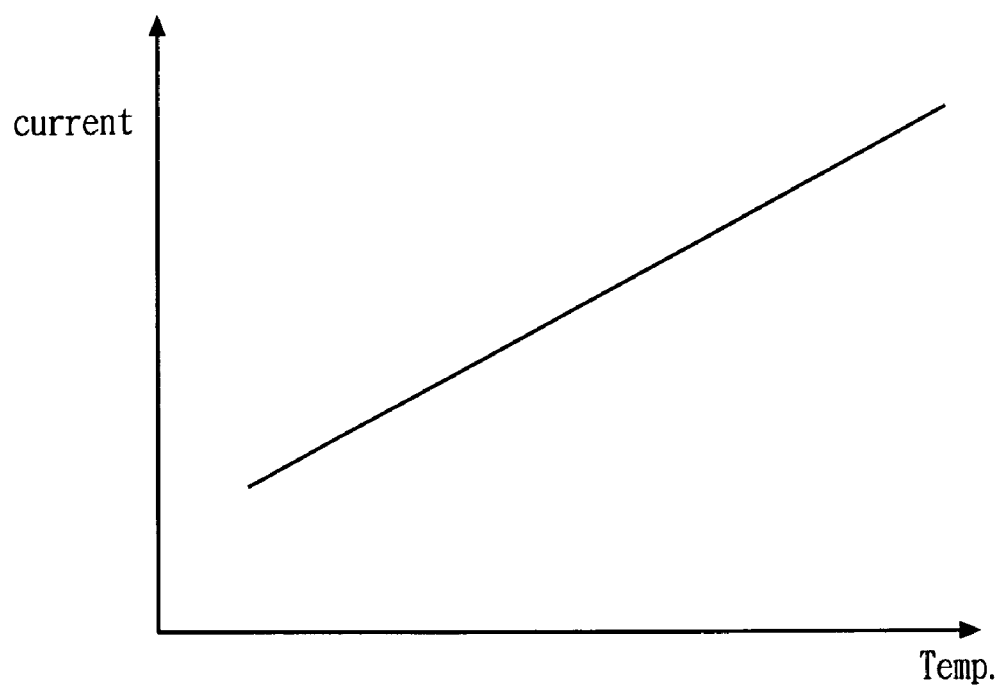
FIG. 2($a$) shows an initial current increasing with the increase in temperature.
Figure 2B:
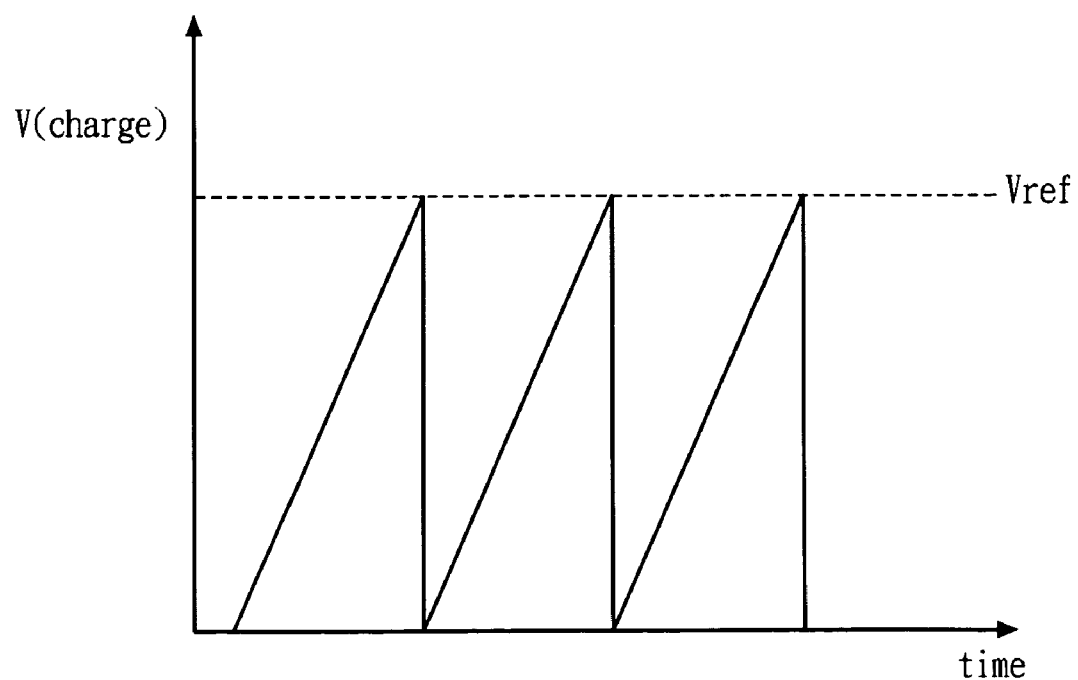

FIG. 2(a) shows that the increase of an initial current corresponds to an increase in temperature. However, the initial current can also increase with the decrease of the temperature as known by persons skilled in the art. FIG. 2(b) shows the relation of the output voltage of the first capacitor 110 and second capacitor 111 versus time. As shown in FIG. 2(b), when the output voltages of the first capacitor 110 and the second capacitor 111 reach the reference voltage Vref, the first transistor 108 and second transistor 109 are rapidly turned on such that the charges stored in the first capacitor 110 and second capacitor 111 are discharged to ground. If the output current of the first current source 101 increases with the increase in temperature, because the charges are equal to current multiplied by time, and the charges being charged to the reference voltage Vref are fixed, the charging period is inversely corresponding to the temperature value.

Figure 3:
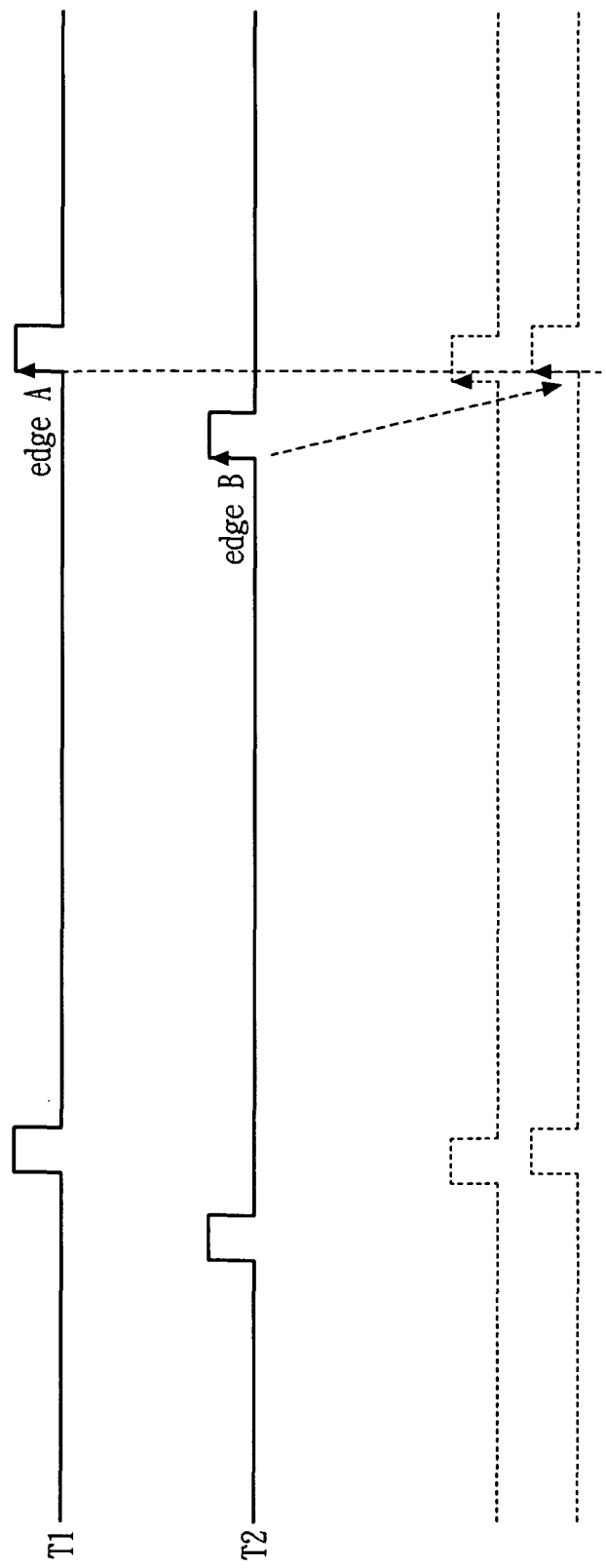
FIG. 3 shows a sequence of events after the controller adjusts the output current of the second current source.

FIG. 3 shows a sequence of events after the controller 113 adjusts the output current of the second current source 102. A first pulse T1 is generated by the first current source 101, and a second pulse T2 is generated by the second current source 102, where the period of the first pulse T1 is inversely proportional to the current value of the first current mirror 101, and the period of the second pulse T2 is inversely proportional to the current value of the second current mirror 102. If the first pulse T1 appears earlier than the second pulse T2, the controller 113 enhances the output current of the second current mirror 102. In contrast, if the first pulse T1 appears later than the second pulse T2, as shown in the upper waveform, the controller 113 reduces the output current of the second current mirror 102 such that the charging period of the second pulse T2 is extended. To reduce the output current of the second current mirror 102, the controller 113 may disable some of the switches 112 related to the second current source.

However, when the first pulse T1 and second pulse T2 appear at about the same time, e.g., as shown as the dotted line in FIG. 3, the temperature value is calculated based on the current value of the second current mirror 102 or the combination of the switches 112.

The initial current i1 in accordance with the embodiment of the present invention can be enhanced to increase the difference between the current per degree Centigrade and the period such that the objective of greater accuracy can be realized. In addition, the phase detector 105 can provide a better accuracy. For example, if the difference between T1 and T2 is in a range of −20 ps and 40 ps, it is determined that the alignment is completed.

The above-described embodiments of the present invention are intended to be illustrative only. Numerous alternative embodiments may be devised by persons skilled in the art without departing from the scope of the following claims.

What is claimed is:

1. A temperature detector, comprising:
   a first current mirror whose current is temperature-dependent;
   a second current mirror whose current is temperature-independent;
   a first capacitor connected to an output of the first current mirror;
   a second capacitor connected to an output of the second current mirror;
   a first comparator whose input terminal is connected to the first capacitor and a reference voltage;
   a second comparator whose input terminal is connected to the second capacitor and the reference voltage;
   a phase detector connected to the output of the first comparator and second comparator;
   a first transistor having a gate, an input terminal and an output terminal, wherein the gate is connected to the output of the first comparator, the input terminal is connected to the first capacitor and the output terminal is grounded;
   a second transistor having a gate, an input terminal and an output terminal, wherein the gate is connected to the output of the second comparator, the input terminal is connected to the second capacitor and the output terminal is grounded; and
   a controller, wherein an input of the controller is connected to the output of the phase detector, and the controller is configured to control the output current of the second current mirror.

2. The temperature detector of claim 1, wherein the gates of the first and second transistors are connected to the outputs of the first comparator and the second comparator, respectively, through a delay unit.

3. The temperature detector of claim 1, wherein the first capacitor and the second capacitor have the same capacitance.

4. The temperature detector of claim 1, wherein the second current mirror has a plurality of switches, and the controller modifies the current value of the second current mirror by adjusting the switches.

5. The temperature detector of claim 1, wherein the controller comprises a counter whose content is adjusted in accordance with the output of the phase detector.

6. The temperature detector of claim 1, wherein the controller enhances the output current of the second current mirror if the output pulse of a first pulse generator appears earlier than the output pulse of a second pulse generator; otherwise, the controller reduces the output current of the second current mirror.

7. A temperature detector, comprising:
a first current mirror whose current is temperature-dependent;
a second current mirror whose current is temperature-independent;
a first pulse generator connected to an output of the first current mirror, wherein the pulse period of the first pulse generator is inversely proportional to the current value of the first current mirror;
a second pulse generator connected to an output of the second current mirror, wherein the pulse period of the second pulse generator is inversely proportional to the current value of the second current mirror;
a phase detector connected to the output of the first and second pulse generators; and
a controller whose input terminal is connected to the output of the phase detector, used to control the output current of the second current mirror, wherein if the output pulse of the first pulse generator appears earlier than the output pulse of the second pulse generator, the controller enhances the output current of the second current mirror; otherwise, the controller reduces the output current of the second current mirror.

8. The temperature detector of claim 7, wherein the second current mirror has a plurality of switches, and the controller modifies the current value of the second current mirror by adjusting the switches.

9. The temperature detector of claim 7, wherein the controller comprises a counter whose content is adjusted in accordance with the output of the phase detector.

10. The temperature detector of claim 7, wherein the first pulse generator comprises:
a first capacitor connected to the output of the first current mirror;
a first comparator whose input terminal connected to the first capacitor and a reference voltage;
a delay unit with one end connected to the output of the first comparator; and
a first transistor having a gate, an input terminal and an output terminal, wherein the gate is connected to the other end of the delay unit, the input terminal is connected to the first capacitor and the output terminal is grounded.

11. The temperature detector of claim 7, wherein the second pulse generator comprises:

a second capacitor connected to the output of the second current mirror;
a second comparator whose input terminal is connected to the second capacitor and a reference voltage;
a delay unit whose one end is connected to the output of the second comparator; and
a second transistor having a gate, an input terminal and an output terminal, wherein the gate is connected to the other terminal of the delay unit, the input terminal is connected to the second capacitor and the output terminal is grounded.

12. A method of using a temperature detector, comprising the steps of:
providing a temperature-dependent current from a first current mirror and a temperature-independent current from a second current mirror;
generating a first pulse and a second pulse, wherein the period of the first pulse is inversely proportional to the current value of the first current mirror, and the period of the second pulse is inversely proportional to the current value of the second current mirror;
increasing the output current of the second current mirror if the first pulse appears earlier than the second pulse;
decreasing the output current of the second current mirror if the first pulse appears later than the second pulse; and
calculating a temperature value in accordance with the current value of the second current mirror if the first pulse and the second pulse appear at substantially the same time.

13. The method of claim 12, further comprising the step of setting a counter, wherein the counter is used to calculate the temperature value.

14. The method of claim 12, wherein the generating step comprises:
charging a capacitor by the first and second current mirrors; and
generating the first and second pulses if the output voltage of the capacitor is greater than a reference voltage; and
erasing charges of the capacitor.

15. The method of claim 12, further comprising the step of setting switches connected to the second current switch, wherein some of the switches are turned off if the current of the second current mirror needs to be decreased.

* * * * *